(12) United States Patent
Stewart et al.

(10) Patent No.: US 7,658,579 B1
(45) Date of Patent: Feb. 9, 2010

(54) NUT AND RETAINER FASTENER ASSEMBLY

(75) Inventors: Robert E. Stewart, Farmington Hills, MI (US); Charles Lee Dardas, Rochester, MI (US)

(73) Assignee: Alpha Stamping Company, Livonia, MI (US)

( * ) Notice: Subject to any disclaimer, the term of this patent is extended or adjusted under 35 U.S.C. 154(b) by 506 days.

(21) Appl. No.: 11/581,520

(22) Filed: Oct. 16, 2006

(51) Int. Cl.
*F16B 39/284* (2006.01)
(52) U.S. Cl. ............... 411/112; 411/103; 411/547; 280/788
(58) Field of Classification Search ............ 411/112, 411/84, 85, 87, 88, 90; 248/229.16, 229.26
See application file for complete search history.

(56) References Cited

U.S. PATENT DOCUMENTS

| | | | | |
|---|---|---|---|---|
| 3,060,988 A | * | 10/1962 | Munse | 411/103 |
| 3,623,761 A | * | 11/1971 | Nadherny | 411/90 |
| 4,015,874 A | * | 4/1977 | Hennessy | 295/42.2 |
| 5,118,234 A | * | 6/1992 | Norkus | 411/182 |
| 5,676,510 A | * | 10/1997 | Fischer et al. | 411/84 |
| 6,254,161 B1 | * | 7/2001 | Wochaski | 296/29 |
| 6,302,361 B1 | * | 10/2001 | Schaefer et al. | 248/27.3 |
| 6,443,677 B1 | * | 9/2002 | Patterson, Jr. | 411/174 |
| 7,182,562 B2 | * | 2/2007 | Botosan et al. | 411/122 |

* cited by examiner

*Primary Examiner*—Gary Estremsky
(74) *Attorney, Agent, or Firm*—Reising Ethington PC

(57) ABSTRACT

A nut and retainer fastener assembly includes a one-piece retainer having a flat base with an opening and a plurality of retainer clips extending from the base around the opening. At least one flange nut is secured to the base between adjacent clips and offset from the opening in the base. The opening preferably is polygonal, most preferably rectangular (including square), and the clips preferably are disposed at corners of the opening. The clips preferably have integral spring fingers that extend from ends of the clips toward the base and at an angle away from the opening to capture the mounting wall between the base and the ends of the spring clips. The base preferably has an ear extending away from the opening, most preferably laterally opposed ears extending away from the opening, and a flange nut mounted on each of the ears for alignment with a fastener opening in the mounting wall when the nut and fastener assembly is secured to the wall. The preferred but exemplary embodiment of the disclosure is for securing the end of a shock absorber to the mounting wall and includes a shock absorber mount secured by fasteners that extend through fastener openings in the mounting wall into threaded engagement with the flange nuts.

15 Claims, 4 Drawing Sheets

NUT AND RETAINER FASTENER ASSEMBLY

The present disclosure relates to a nut and retainer fastener assembly for securing the nut to a wall or other mounting structure.

BACKGROUND AND SUMMARY OF THE DISCLOSURE

A general object of the present disclosure is to provide a nut and retainer fastener assembly for mounting a nut to a mounting structure, such as a flat panel or wall, such that the nut can be threadably engaged through a fastener opening in the mounting structure.

The present disclosure involves a number of aspects that can be implemented separately from or in combination with each other.

A nut and retainer fastener assembly in accordance with one aspect of the present disclosure includes a one-piece retainer having a flat base with an opening and a plurality of retainer clips extending from the base around the opening. At least one flange nut is secured to the base between adjacent clips and offset from the opening in the base. The opening preferably is polygonal, most preferably rectangular (including square), and the clips preferably are disposed at corners of the opening. The clips preferably have integral spring fingers that extend from ends of the clips toward the base and at an angle away from the opening to capture the mounting wall between the base and the ends of the spring clips. The base preferably has an ear extending away from the opening, most preferably laterally opposed ears extending away from the opening, and a flange nut is mounted on each of the ears for alignment with a fastener opening in the mounting wall when the nut and fastener assembly is secured to the wall. The preferred but exemplary embodiment of the disclosure is for securing the end of a shock absorber to the mounting wall and includes a shock absorber mount secured by fasteners that extend through fastener openings in the mounting wall into threaded engagement with the flange nuts.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
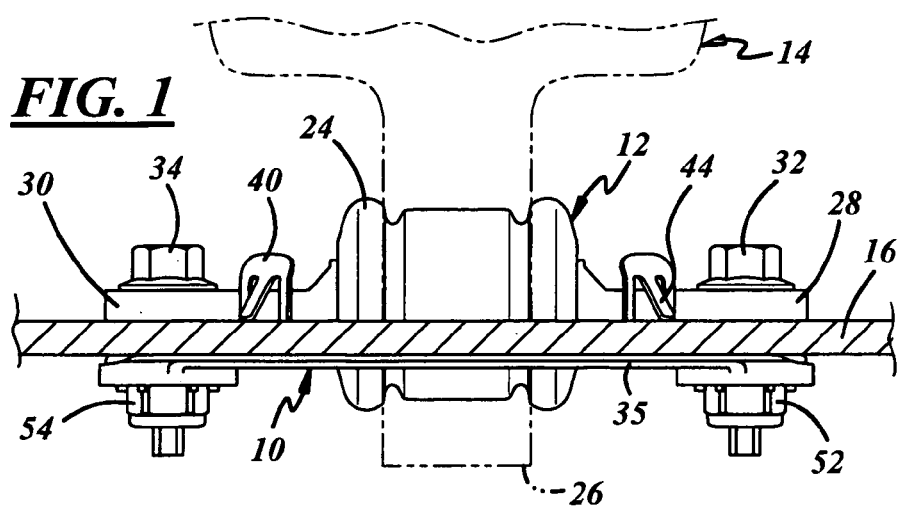
FIG. 1 is an elevational view of a nut and retainer fastener assembly in accordance with an exemplary embodiment of the present disclosure in a shock absorber mounting arrangement.
Figure 2:
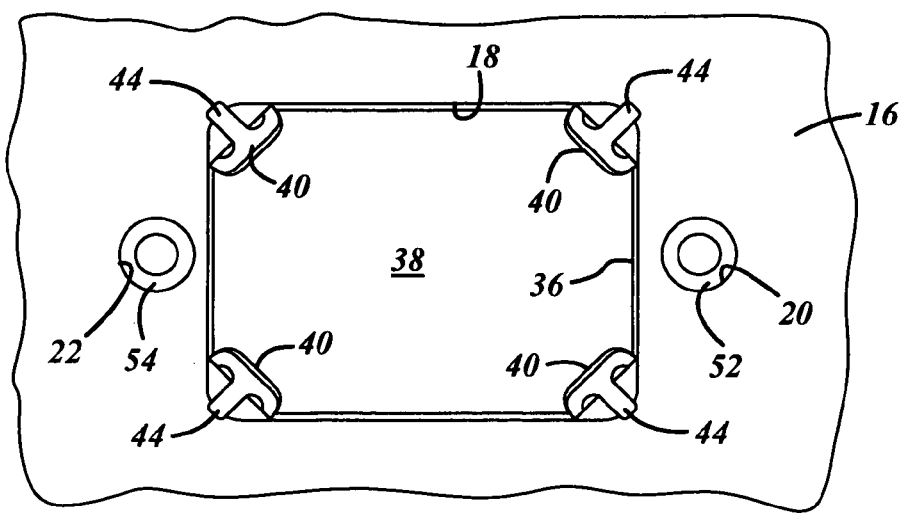
FIG. 2 is a top plan view of the nut and retainer fastener assembly in FIG. 1 secured to the mounting wall.
Figure 3:
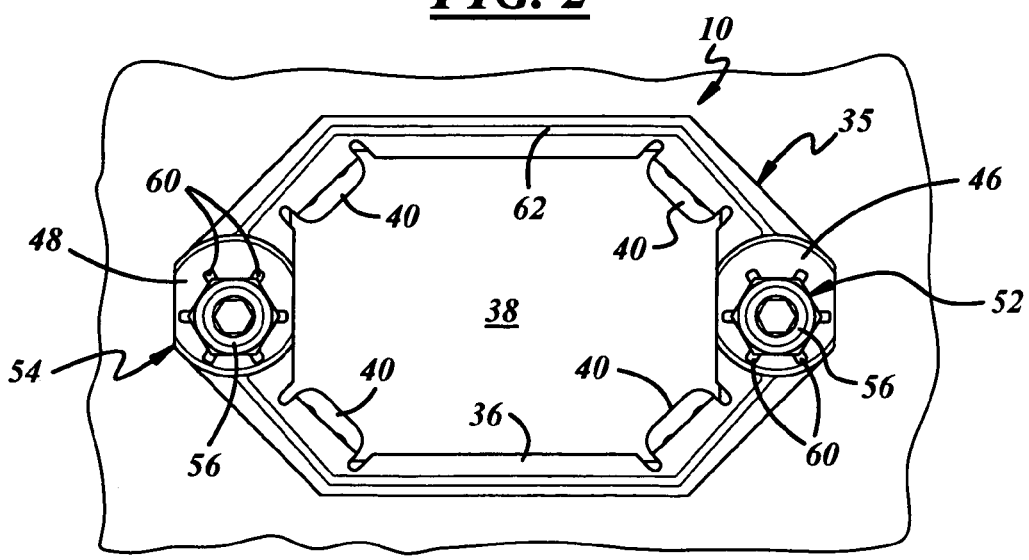
FIG. 3 is a bottom plan view of the nut and retainer fastener assembly in FIG. 1 secured to the mounting wall.
Figure 4:
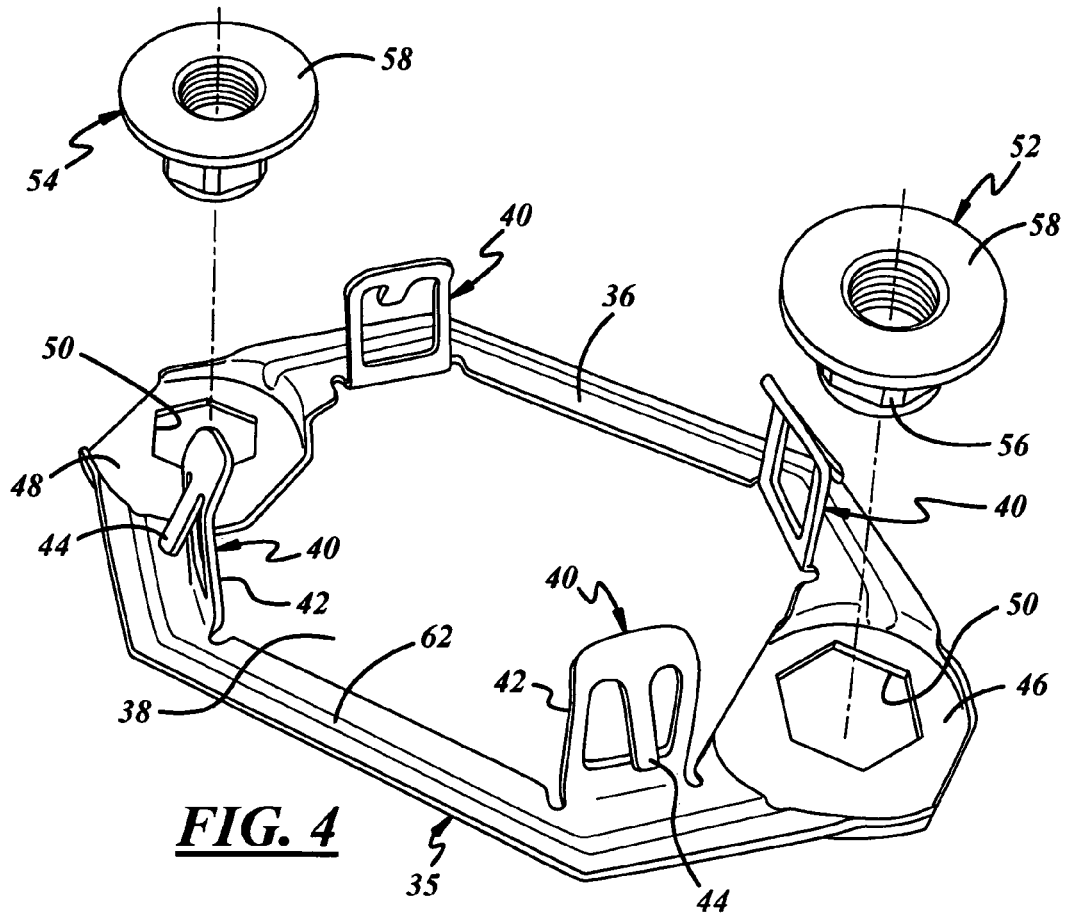
FIG. 4 is an exploded perspective view of the nut and retainer fastener assembly.

FIG. 1 illustrates a nut and retainer fastener assembly 10, in accordance with an exemplary embodiment of the present disclosure, combined with a shock absorber mount 12 for mounting a shock absorber 14 to a mounting wall or panel 16. Mounting wall 16 may be a section of frame channel stock, for example. As best seen in FIG. 2, mounting wall 16 has a mounting opening 18 and at least one laterally offset fastener opening 20. There preferably are a pair of laterally opposed fastener openings 20, 22. Mounting opening 18 preferably is generally polygonal, most preferably generally rectangular (including square). (The term "generally rectangular" accommodates minor tolerance variations and the preferred rounded corners illustrated in FIG. 2.) Shock absorber mount 12 may have a body 24 of elastomeric construction for receiving the mounting strap 26 of shock absorber 14, and a pair of laterally extending legs 28, 30 for alignment with mounting openings 20, 22 and receiving mounting screws 32, 34.

Nut and retainer fastener assembly 10 preferably includes a retainer 35 having a generally flat base 36 and a central opening 38. Base 36 preferably comprises a continuous polygonal rim that surrounds opening 38, and opening 38 preferably is polygonal, most preferably generally rectangular (including square). A plurality of retainer clips 40 extend from base 36, preferably at an angle across each corner of opening 38. Each clip 40 includes a leg 42 integrally extending from base 36, preferably at a corner of opening 38 and at substantially a right angle to base 36. The free end of each leg 42 preferably is bent inwardly toward opening 38 to facilitate insertion into mounting opening 18 (FIG. 2). A spring finger 44 integrally extends from the end of each leg 42 toward base 36 and at an angle away from opening 38. When clips 40 are urged through mounting opening 18 (FIG. 2), the thickness of the wall around the mounting opening is received by snap fit between the ends of fingers 44 and base 36 of retainer 35, as best seen in FIG. 1.

Figure 5:
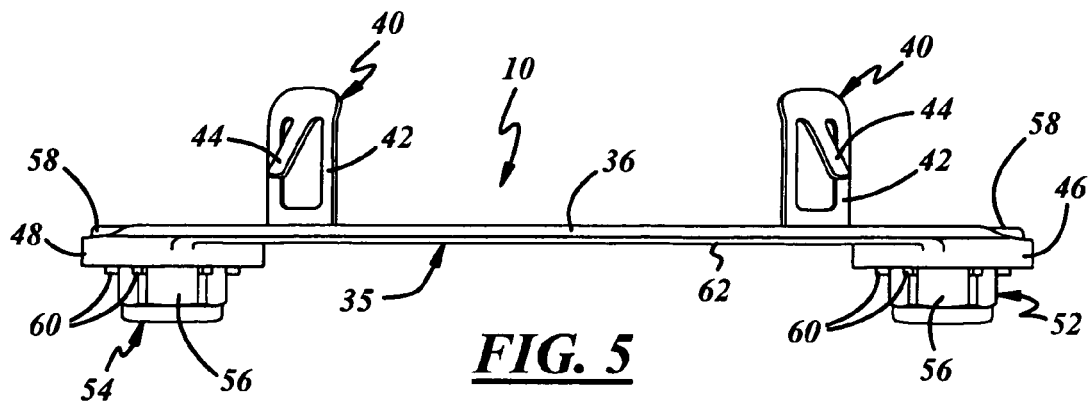
FIG. 5 is a side elevational view of the nut and retainer fastener assembly of FIG. 4.
Figure 6:
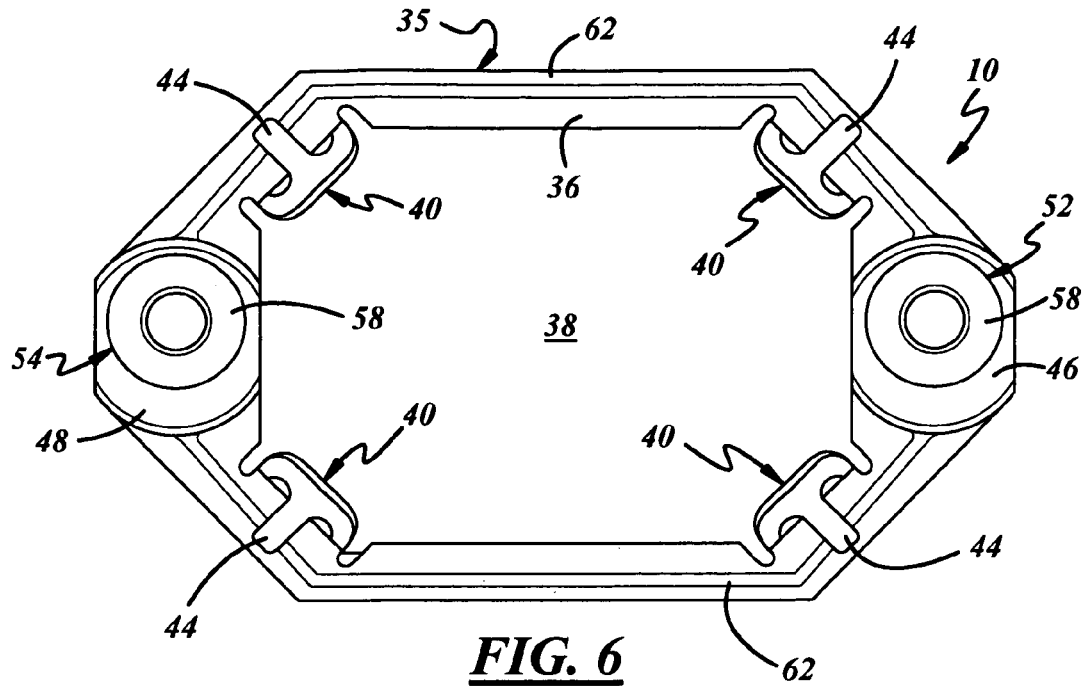
FIG. 6 is a top plan view of the nut and retainer fastener assembly of FIGS. 4-5.
Figure 7:
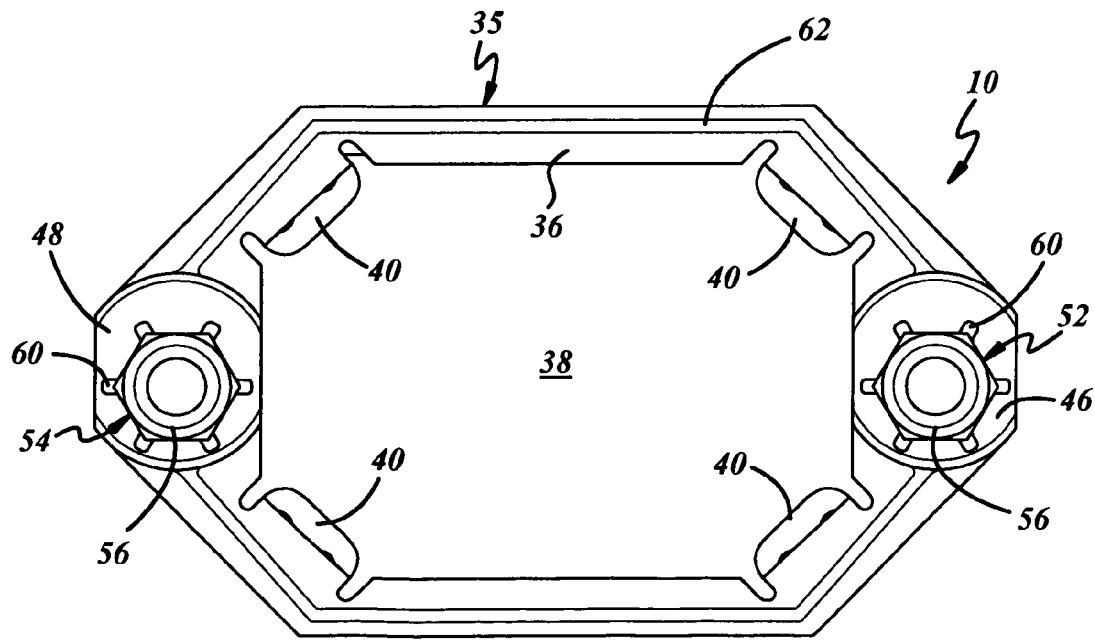
FIG. 7 is a bottom plan view of the nut and retainer fastener assembly of FIGS. 4-6.
Figure 8:
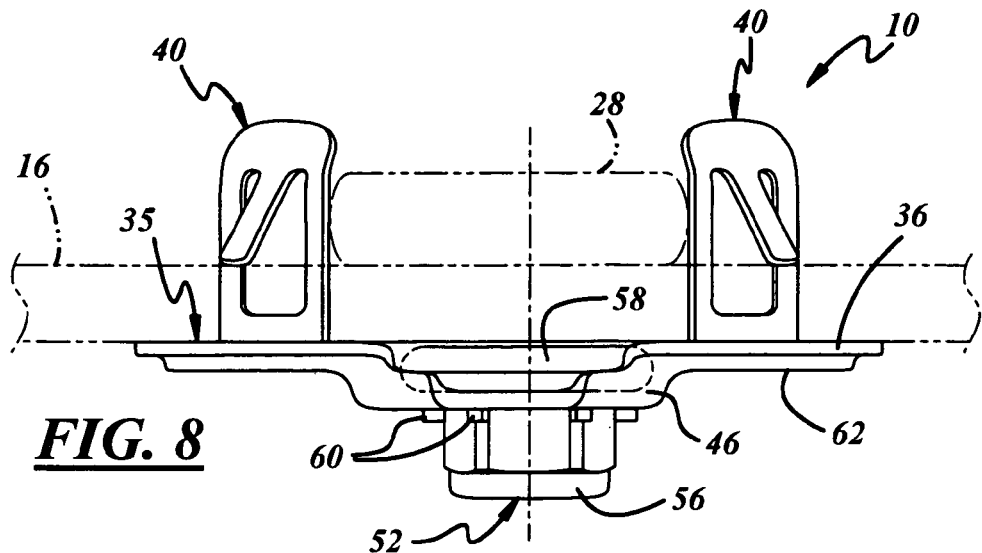
FIG. 8 is an end elevational view of the nut and retainer fastener assembly of FIGS. 4-7.

Base 36 of retainer 35 preferably has at least one laterally extending ear 46. In the exemplary embodiment illustrated in the drawings, there are a pair of laterally extending ears 46, 48 extending from opposite ends of retainer 35 and centrally aligned with a longitudinal dimension of base 35. Each ear 46, 48 has a hexagonal opening 50. A flange nut 52, 54 is mounted within hexagonal opening 50 of each ear 46, 48. Openings 50 can be centered or off-center in ears 46, 48. Each flange nut 52, 54 includes a hexagonal body 56 and a flange 58. As best seen in FIGS. 5 and 8, ears 46, 48 preferably are slightly offset with respect to the plane of base 36 so that flanges 58 of nuts 52, 54 have surfaces at or below the plane of base 35 that engages mounting wall 16. In this way, as illustrated in FIG. 1, the nut flanges do not interfere with flush mounting of retainer 35 against the opposing face of wall 16. Nuts 52,54 preferably are secured to retainer ears 46,48 by staking 60 at least two corners of each nut body 56. Nuts 52, 54 can be tight or loose in openings 50.

Retainer 35 preferably is of metallic construction, and may be made of spring steel in a progressive blanking and bending operation for example. A strengthening rib 62 may be formed to extend around base 36 to help prevent undesired bending of the base. To mount the one-piece retainer and fastener assembly 10 in a preformed mounting opening 18 in a mounting wall 16, spring clips 40 are urged through the corners of the mounting opening, which preferably are rounded to facilitate engagement with spring fingers 44 as best seen in FIG. 2. When clips 40 are secured within mounting opening 18, the threaded openings of nuts 52,54 are automatically aligned with fastener openings 20, 22 of wall 16 as illustrated in FIG. 2. The desired structure, such as shock absorber mount 12 by way of example in FIG. 1, can then be mounted to wall 16 by means of screws 30,32 extending through fastener openings 20,22 in wall 16 into threaded engagement with nuts 52,54 of assembly 10.

Figure 9:
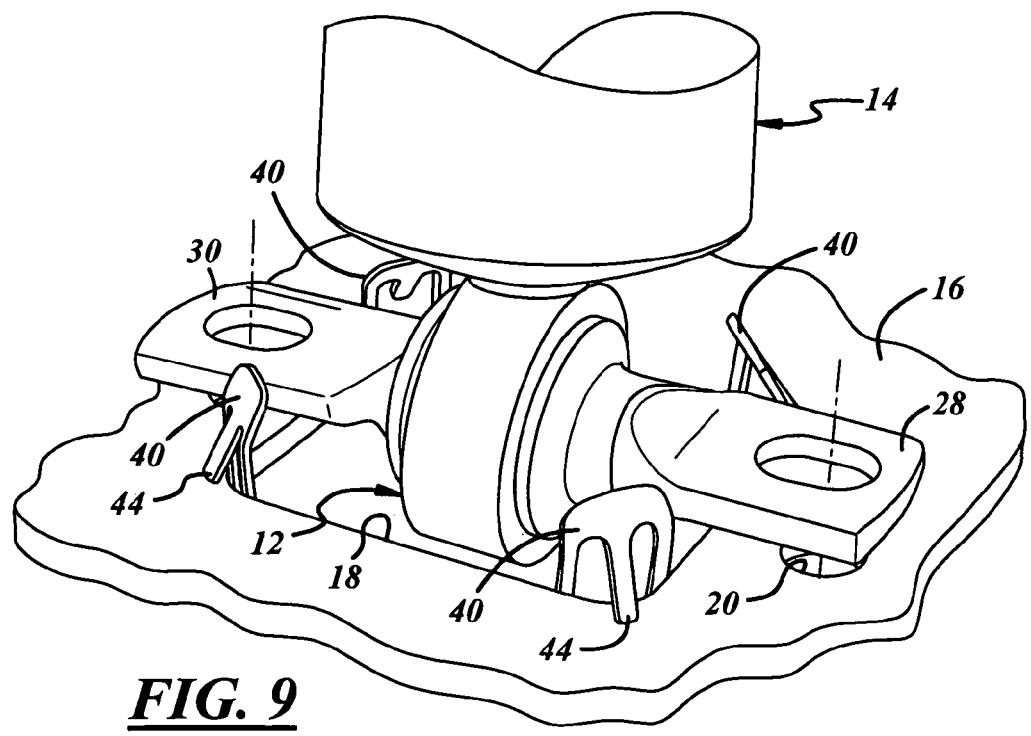
FIG. 9 is a fragmentary perspective view of the nut and fastener assembly mounting a shock absorber and a shock absorber mount to a panel.

In the exemplary implementation of the disclosure for securing a shock absorber 14 and a shock absorber mount 12 to a wall or panel 16, it is preferred that retainer clips 40 be at a spacing that only is slightly wider than legs 28, 30 of mount 12. In this way, clips 40 automatically align legs 28, 30 with openings 20, 22 and nuts 52, 54 as mount 12 is moved between the clips, as shown in FIGS. 8 and 9. This significantly reduces assembly time.

There thus has been disclosed a nut and retainer fastener assembly that fully satisfies all of the objects and aims previously set forth. The disclosure has been presented in conjunction with an exemplary embodiment, and a number of modifications and variations have been discussed. Other modifications and variations readily will suggest themselves to persons of ordinary skill in the art in view of the foregoing description. It will be apparent, for example, that, although rectangular mounting openings 18 are preferred for reasons of simplicity of design, other mounting opening geometries and corresponding retainer base geometries can be employed. It also is envisioned that the retainer could be employed with only one flange nut, or with more than two flange nuts in suitable applications. The disclosure is intended to embrace all such modifications and variations as fall within the spirit and broad scope of the appended claims.

The invention claimed is:

1. A nut and fastener assembly that includes:
   a one-piece retainer having a flat base with a generally rectangular opening and a plurality of retainer clips extending from said base across corners of said generally rectangular opening, and
   at least one flange nut secured to said base between adjacent clips and offset from said opening.

2. The assembly set forth in claim 1 wherein said opening in said base is generally polygonal and said clips are disposed at corners of said generally polygonal opening.

3. The assembly set forth in claim 1 wherein said clips have integral spring fingers extending from ends of said clips toward said base and angled away from said opening.

4. The assembly set forth in claim 1 wherein said flat base is continuous around said opening.

5. The assembly set forth in claim 4 wherein said base has at least one ear extending away from said opening and a hexagonal opening in said ear, said flange nut being mounted in said hexagonal opening.

6. The assembly set forth in claim 5 wherein said base has outwardly extending ears and a flange nut mounted in each of said ears.

7. The assembly set forth in claim 6 wherein said ears are offset from said base and flanges of said flange nuts are disposed within such offsets.

8. A nut and retainer fastener assembly adapted to be assembled to a mounting structure that has a generally flat mounting wall with a generally rectangular mounting opening and at least one fastener opening spaced from said mounting opening, said fastener assembly including:
   a retainer having a flat polygonal base with a generally rectangular central opening, retainer clips extending across corners of said central opening, at least one ear extending from said base away from said central opening and a hexagonal opening in said ear, and
   a flange nut mounted in said hexagonal opening,
   said retainer clips being adapted to be received by snap fit at corners of the rectangular mounting opening in the mounting wall so as to position said flange nut in alignment with the fastener opening in the mounting wall.

9. The assembly set forth in claim 8 wherein each of said retainer clips has an integral spring finger extending from an end of said clip toward said base and away from said central opening for receiving the mounting wall between said base and said fingers.

10. The assembly set forth in claim 9 wherein said base has outwardly extending ears and flange nuts mounted on each of said ears for alignment with fastener openings on opposite sides of the mounting opening in the wall.

11. The assembly set forth in claim 10 wherein said ears are offset from said base and flanges of said flange nuts are disposed within such offsets.

12. A shock absorber mount assembly for mounting a shock absorber to a wall having a generally rectangular opening for receiving an end of a shock absorber and a pair of laterally spaced fastener openings, said assembly including:
   a nut and retainer assembly as set forth in claim 11 for mounting in the generally rectangular opening in the wall and positioning said flange nuts in alignment with the fastener openings,
   a shock absorber mount having a central elastomeric body and a pair of oppositely extending legs with openings for alignment with the fastener openings in the wall, and
   a pair of screws for extending through said legs and through the fastener openings into threaded engagement with said flange nuts.

13. The shock absorber mount assembly set forth in claim 12 wherein spacing between said retainer clips is slightly greater than width of said legs such that said clips align said legs with said flange nuts as said shock absorber mount is inserted between said clips.

14. A nut and fastener assembly that includes:
   a one-piece retainer having a flat base with an opening and a plurality of retainer clips extending from said base around said opening, and
   at least one flange nut secured to said base between adjacent clips and offset from said opening,
   said flat base being continuous around said opening,
   said base having ears extending outwardly away from said opening and a hexagonal opening in each said ear,
   a flange nut being mounted in each of said hexagonal openings,
   said ears being offset from said base and flanges of said flange nuts being disposed within such offsets.

15. The assembly set forth in claim 14 wherein said opening is generally rectangular and said clips extend across corners of said generally rectangular opening.

* * * * *